Sept. 8, 1964

A. G. STIMSON 3,147,680

PHOTOGRAPHIC LIGHT MEASURING DEVICE

Filed May 7, 1963

ALLEN G. STIMSON
INVENTOR.

BY *R. Frank Smith*
*Eugene S. Stephens*
ATTORNEYS

United States Patent Office 3,147,680
Patented Sept. 8, 1964

3,147,680
PHOTOGRAPHIC LIGHT MEASURING DEVICE
Allen G. Stimson, Rochester, N.Y., assignor to Eastman Kodak Company, Rochester, N.Y., a corporation of New Jersey
Filed May 7, 1963, Ser. No. 278,691
8 Claims. (Cl. 95—10)

This invention relates to a photographic light measuring device such as a camera exposure control system or exposure or light meter either mounted on or independent of a camera, and more particularly to means for regulating the sensitivity of such a device.

It is desirable to variably attenuate or adjust the sensitivity of photographic exposure meters or exposure control systems in accordance with exposure variables such as film sensitivity or shutter speed. For exposure determining devices having electric-to-mechanical transducers, such sensitivity regulating can be accomplished by adjusting the value of an impedance in circuit with the transducer. For example, different values of resistance can be selectively placed in circuit with the transducer either by means of a continuously variable resistance or selectable discrete resistances.

It is an object of this invention to provide improved means for indicating the adjusted sensitivity of a light measuring device.

Another object of the invention is to provide means employing the electric-to-mechanical transducer of an exposure meter or control system for indicating the sensitivity adjustment of the meter or control.

Another object of the invention is to provide means for informing the camera operator of the sensitivity of the camera's light measuring or exposure determining device.

Another object of the invention is to adjust the sensitivity of a light measuring device with an accuracy that is independent of other electrical variations in the device.

These and other objects of the invention are accomplished by generating a predetermined calibrating signal for energizing an electric-to-mechanical transducer of a light measuring device and then using such transducer for indicating the device's sensitivity, a desired value of which is obtained by adjusting a variable impedance in circuit with the transducer.

Figure 1:
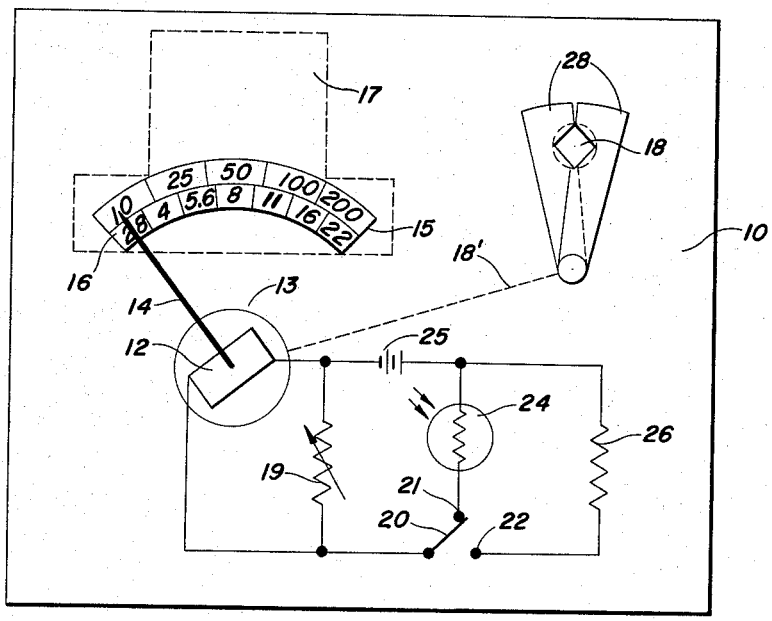
Figure 2:
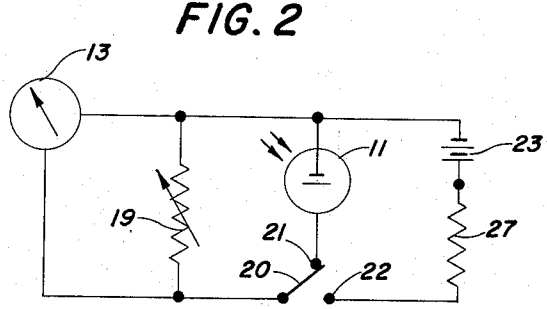

The invention will be more fully understood by reference to the following specification and the attached drawings wherein:

FIG. 1 shows a partially schematic front view of an exposure meter embodying the invention and mounted in a camera; and FIG. 2 shows a schematic diagram of an alternate circuit for a light measuring device embodying the invention.

In FIG. 1, a light measuring device according to the invention is shown arranged within a camera body 10 although it could be separate from a camera. A photoconductive cell 24 powered by a battery 25 and illuminatable by scene light is shown as electrically connected, through the normal engagement of a movable switch arm 20 with contact 21, to an electric-to-mechanical transducer, illustrated as electric measuring instrument 13, for energizing the latter to deflect its movable coil 12 as a function of scene light. Of course, electric-to-mechanical transducers having movable members other than a movable coil may be employed. The transducer movable member such as coil 12 can be used to indicate light or exposure conditions as by cooperation between a pointer 14, which is fastened to coil 12, and a scale 16 bearing indicia such as diaphragm aperture size. Also, such a light measuring device, when mounted in a camera as shown in FIG. 1, can control an exposure variable as is shown schematically by dashed line 18' leading from instrument 13 to aperture-size adjusting members 28 whose relative positions can be controlled in well-known ways in response to the position of coil 12.

For varying the sensitivity of the light measuring device, a variable resistance 19 is shown electrically connected in shunt relation with electric measuring instrument 13 for shunting a portion of the energization or electric signal produced in response to sensed illumination. Resistance 19 may be a continuously variable resistor, as shown, or a plurality of selectable, discrete resistances of different values. Also, variable resistance 19 may be connected in series or other relation with the electric measuring instrument 13 for regulating the energization of the latter.

For making a sensitivity adjustment of the light measuring device according to the invention, a predetermined calibrating signal of suitable strength is generated for energizing instrument 13, and variable resistor 19 is adjusted to produce a desired instrument response to such calibrating signal. To produce such a calibrating signal, switch arm 20 is moved into engagement with a second contact 22, effectively disconnecting cell 24 from instrument 13 and connecting a fixed resistor 26 with instrument 13 and variable resistor 19 in place of the cell. Resistor 26 is selected so that the energization of coil 12 in response to battery 25 is appropriate for the scale characteristics of instrument 13.

To obtain a desired sensitivity for the light measuring device, variable resistor 19 is adjusted until the energization of instrument 13 in response to the above-mentioned calibrating signal produces a deflection of movable coil 12 sufficient to bring pointer 14 to a desired sensitivity number on a second, calibrating scale 15 which bears instrument sensitivity indicia. Such indicia is shown in FIG. 1 as ASA film sensitivity numbers, but other exposure indicia such as shutter speed or diaphragm aperture size may be used. Both scales 15 and 16 are arranged to be visible to the camera operator, and in FIG. 1 are shown as visible in a camera viewfinder 17 which is indicated by a broken line.

Since the sensitivity of the light measuring device is indicated by such electric measurement rather than being set merely in reliance upon presumed resistance and voltage values, adjustment of variable resistor 19 in accordance with such indication produces accurate sensitivity adjustment in spite of variations in the voltage of battery 25 or non-linearity of resistor 19, etc.

Illustrated in FIG. 2 is a light measuring device circuit adapted to accommodate a photovoltaic cell 11 in place of the photoconductive cell 24 and battery 25 of FIG. 1. The photovoltaic cell 11 acts as a variable source of voltage in series with a resistance (its own internal resistance) and, so far as the rest of the circuit is concerned, is the effective equivalent of the fixed voltage source 25 and variable resistance cell 24 of FIG. 1. The change of type of photocell in the circuit of FIG. 2 does not alter the circuit's normal operation of energizing instrument 13 as a function of scene light.

The circuit of FIG. 2 is adjusted for sensitivity in the same way as the circuit of FIG. 1 except that the means for generating a calibrating signal is different. Moving switch arm 20 away from contact 21 and into engagement with contact 22 effectively disconnects cell 11 from instrument 13 and connects battery 23 and resistor 27 with instrument 13 and variable resistor 19 in its place. The combination of battery 23 and resistor 27 is selected to produce energization of predetermined value for instrument 13. An alterntive method of generating a predetermined calibrating signal for the light measuring device of FIG. 2 is to illuminate photovoltaic cell 11 with a standard light source (not shown). In either case, variable resistor 19 is then adjusted as described above.

The invention has been described in detail with particular reference to preferred embodiments thereof, but it will be understood that variations and modifications can be effected within the spirit and scope of the invention as described hereinabove and as defined in the appended claims.

The embodiments of the invention in which an exclusive property or privilege is claimed are defined as follows:

1. In a photographic light measuring device having
   (a) an electric-to-mechanical transducer including a movable member,
   (b) a variable impedance electrically in circuit with said transducer for regulating the sensitivity of said transducer, and
   (c) means including an illuminatable photoresponsive element normally in electric circuit with said transducer for generating an electric signal correlated to illumination of said element and in response to which said movable member is positionable, means for selectively adjusting said variable impedance to obtain a desired transducer sensitivity, said means comprising:
   (1) means for generating a predetermined calibrating signal;
   (2) means selectively operable for energizing said transducer responsively to said calibrating signal and independently of the signal from said photoresponsive element;
   (3) means cooperable with said movable member and operative upon energization of said transducer by said calibrating signal for indicating sensitivity values corresponding to positions of said member; and
   (4) means for varying said impedance to position said member to indicate a desired sensitivity.

2. The device of claim 1 wherein said calibrating signal generating means comprises a source of electric potential and wherein said selectively operable means comprises switch means for electrically disconnecting said element and said transducer and for electrically connecting said transducer and said source.

3. The device of claim 1 wherein said cooperable means comprises a pointer and scale, one of which is movable with said movable member.

4. The device of claim 1 wherein said calibrating signal generating means comprises a source of electric potential in circuit with said transducer and a resistance, and said selectively operable means comprises switch means for electrically disconnecting said element and said transducer and for electrically connecting said transducer and said resistance.

5. In a photographic camera having a light measuring device including
   (a) an electric-to-mechanical transducer having a movable member positionable in response to the energization of said transducer,
   (b) a variable resistance electrically in circuit with said transducer for regulating the sensitivity of said transducer, and
   (c) means normally in electric circuit with said transducer and including a photoresponsive element illuminatable by scene light for variably energizing said transducer as a function of illumination of said element, means for selectively adjusting said variable resistance to obtain a desired transducer sensitivity, said means comprising:
   (1) means for generating a predetermined calibrating signal;
   (2) means selectively operable for energizing said transducer responsively to said calibrating signal and independently of the signal from said photoresponsive element;
   (3) means carried by said camera and cooperable with said movable member and operative upon energization of said transducer by said calibrating signal for indicating sensitivity values corresponding to positions of said member; and
   (4) means for varying said resistance to position said member to indicate a desired sensitivity.

6. In a photographic camera having a light measuring device including
   (a) an electric-to-mechanical transducer having a movable member positionable in response to the energization of said transducer,
   (b) a variable resistance electrically in circuit with said transducer for regulating the sensitivity of said transducer, and
   (c) means normally in electric circuit with said transducer and including battery and a photoconductive cell illuminatable by scene light for variably energizing said transducer as a function of illumination of said cell, means for selectively adjusting said variable resistance to obtain a desired transducer sensitivity, said means comprising:
   (1) a calibrating resistor;
   (2) selectively operable switch means for electrically disconnecting said photoconductive cell from said transducer and electrically connecting said calibrating resistor in circuit with said transducer and said battery as a functional substitute for said photoconductive cell whereby a predetermined calibrating signal is generated for energizing said transducer;
   (3) a pointer and scale one of which is movable with said movable member, said pointer and scale being operative when said transducer is energized by said calibrating signal for indicating transducer sensitivity values corresponding to positions of said member; and
   (4) means for varying said variable resistance to position said member for indicating a desired transducer sensitivity.

7. The camera of claim 6 having an exposure control mechanism responsive to the position of said movable member.

8. The camera of claim 6 having a viewfinder wherein said pointer and scale are visible.

References Cited in the file of this patent
UNITED STATES PATENTS

| | | |
|---|---|---|
| 2,387,466 | Rath | Oct. 23, 1945 |
| 2,573,729 | Rath | Nov. 6, 1951 |
| 2,755,704 | Gilbert | July 24, 1956 |
| 2,973,699 | Nerwin | Mar. 7, 1961 |